United States Patent [19]

Loken

[11] 3,954,069
[45] May 4, 1976

[54] PROCESS AND APPARATUS FOR THE INCINERATION OF AQUEOUS SEWAGE SLUDGE

[75] Inventor: Per A. Loken, Ski, Norway

[73] Assignee: Myrens Verksted A/S, Oslo, Norway

[22] Filed: Mar. 10, 1975

[21] Appl. No.: 557,070

[52] U.S. Cl. .................................. 110/8 R; 110/15
[51] Int. Cl.² ............................................. F23G 5/04
[58] Field of Search ............ 110/8 R, 8 A, 8 C, 7 R, 110/15, 119, 14

[56] References Cited
UNITED STATES PATENTS

| | | | |
|---|---|---|---|
| 2,062,025 | 11/1936 | Harrington | 110/15 |
| 3,329,107 | 7/1967 | Hatchel et al. | 110/15 |
| 3,734,036 | 5/1973 | Abos | 110/15 |
| 3,765,153 | 10/1973 | Grey | 110/119 |
| 3,818,682 | 6/1974 | Farrow et al. | 110/119 |
| 3,859,933 | 1/1975 | Klenck | 110/8 |

Primary Examiner—Kenneth W. Sprague
Attorney, Agent, or Firm—Holman & Stern

[57] ABSTRACT

A process and apparatus for the incineration of aqueous sewage sludge utilizing mechanical de-watering followed by thermal drying of the sludge prior to its being conducted to a combustion chamber for incineration. The water vapor-containing malodorous exhaust gas resulting from the thermal drying of the sludge is passed through a condenser to remove the water vapor therefrom and is thereafter conducted into the combustion chamber of the incinerator for deodorization by heating with the aid of the hot combustion gases in the incinerator.

9 Claims, 1 Drawing Figure

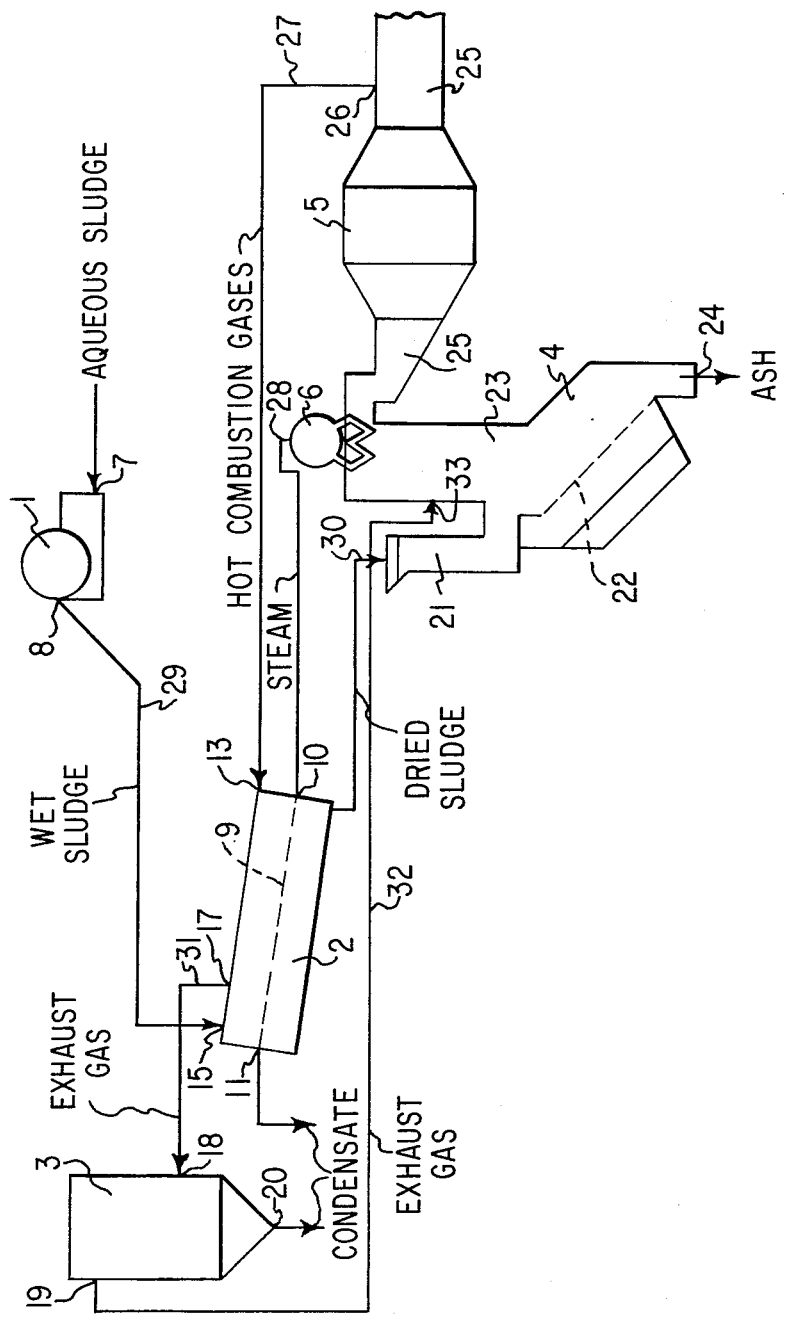

PROCESS AND APPARATUS FOR THE INCINERATION OF AQUEOUS SEWAGE SLUDGE

This invention relates to the disposal of aqueous sewage sludge and, more particular, to a process and apparatus for the incineration of such sludge.

The disposal of aqueous sewage sludge such as from community sewage treatment plants has become a steadily increasing problem in present day living. Among the various approaches employed for disposing of such sludge, the most suitable approach from a hygienic as well as from an economical standpoint has been found to be incineration of the sludge. Sewage sludge as discharged from modern sewage treatment plants generally is a highly aqueous suspension of both solid and putrid matter, generally having an initial water content of approximately 92%. When disposing of the sludge by incineration, the sludge must first be de-watered to complete dryness before a combustion of the sludge takes place. Various methods of de-watering aqueous sludge using mechanical, thermal or chemical means, are known in the art, but complete drying of the sludge, at least in the final stages thereof, is most effectively carried out by thermal treatment of the wet sludge in a suitably heated vaporizer so as to evaporate all of the water from the sludge.

Such thermal drying of the sludge prior to its incineration produces an exhaust gas comprising the air taken taken to the dryer, some malodorous gases and the water vapor evaporated from the wet sludge. Such exhaust gas can be effectively deodorized by heating it to high temperatures on the order of 700 - 800° C., which is generally accomplished by conducting the exhaust gas into the combustion chamber of the incinerator used for incinerating the sludge, whereby the exhaust gas is deodorized by heating with the aid of the hot combustion gases in the incinerator. For maximum efficiency in carrying out such a procedure, it would be highly desirable to keep the quantity of exhaust gas taken to the incinerator for deodorization at as low a level as possible so as to minimize the quantity of heat required in the incinerator for effecting deodorization of the exhaust gas.

It is therefore an object of the present invention to provide a process for the incineration of aqueous sewage sludge such as from community sewage treatment plants, having improved efficiency as compared with the prior practiced processes.

Another object of the invention is to provide a process for the incineration of aqueous sewage sludge including a thermal drying of the sludge prior to its incineration and a deodorization of the exhaust gas resulting from such thermal drying by heating of such exhaust gas, wherein the amount of heat required for deodorizing the exhaust gas is minimized by minimizing the quantity of exhaust gas required to be deodorized.

A further object of the present invention is to provide a process for the incineration of aqueous sewage sludge as described in the preceeding object, wherein the water vapor present in the exhaust gas resulting from the thermal drying of the sludge prior to its incineration, is eliminated from the exhaust gas prior to its deodorization.

Still another object of the present invention is to provide an apparatus for efficiently and economically carrying out the process described in the preceeding objects.

The above and other objects are achieved in accordance with the present invention wherein aqueous sewage sludge such as from community sewage treatment plants is first mechanically de-watered, for example, by filtration, to obtain a wet sludge having a high solids content, which is thereafter substantially completely dried by indirect heating in a heated drier, thereby producing in the drier a dried sludge and a water vapor-containing exhaust gas. The dried sludge is thereafter conducted from the drier to the combustion chamber of a solid refuse incinerator where it is incinerated. The water-containing exhaust gas from the drier is conducted through a condenser, whereby the water is condensed and removed from the exhaust gas to produce a substantially dried exhaust gas, which is thereafter conducted into the combustion chamber of the incinerator used for incinerating the sludge, where the exhaust gas is deodorized by heating with the aid of the hot combustion gases in the incinerator. By removing the water vapor from the exhaust gas prior to its deodorization, the quantity of the exhaust gas taken to the incinerator for deodorization is minimized, thereby greatly reducing the quantity of heat required in the incinerator for effecting the deodorization of the exhaust gas.

The process and apparatus of the present invention and the advantages thereof will be better understood from the following detailed description thereof when considered in conjunction with the accompanying drawing whose single FIGURE illustrates an operational layout for carrying out the process of the present invention for the incineration of aqueous sewage sludge.

Referring now to the FIGURE, an apparatus for effecting the incineration of aqueous sewage sludge is shown as comprising a rotary-drum filter 1, a drier 2, a condenser 3, a solid refuse incinerator 4, an electrical precipitator 5 and a boiler 6. The rotary-drum filter 1 is of standard construction, having an aqueous sludge inlet at 7 and a wet sludge outlet at 8. The drier 2 is a conventional indirect drier. An example of such an indirect drier is the Myren multicoil drier manufactured by Myrens Verksted A/S, Oslo, Norway, having a stationary shell and a heating fluid passage 9 in the form of several tube coils connected to a rotating shaft. The heating fluid passage has a heating fluid inlet at 10 and a heating fluid outlet at 11. Additionally, the drier has a secondary heating gas inlet 13 through which a heating gas may be introduced into direct contact with the sludge in the drier. The drier 2 is also provided with a wet sludge inlet at 15, a dried sludge outlet at 16, and an exhaust gas outlet at 17. The condenser 3 is provided with an exhaust gas inlet at 18, an exhaust gas outlet at 19, and a condensate outlet at 20.

The incinerator 4 is of standard construction and is provided with a charging shaft 21, a combustion grate 22, which generally is of the mechanical type, an uncooled combustion chamber 23 having refractory brick work, a clinker discharge opening 24, and a hot combustion gas outlet duct 25. The outlet duct 25 leads through the electrical precipitator 5 for removing from the hot combustion gases any solid particles that may be suspended therein, and thereafter leads out to the atmosphere. Optionally, as shown in the drawings, downstream of the electrical precipitator 5, the outlet duct 25 may be provided with an outlet opening at 26, connected by conduit 27 to the heating gas inlet 13 of the drier. The quantity of hot combustion gases effluent optionally diverted in this manner for heating the drier 2, will generally be relatively small, with the drier 2 being heated either entirely or at least primarily by means of steam generated in boiler 6 by heat from the incinerator and led through conduit 28 to the heating fluid inlet 10 of the heating passage 9 of the drier 2. Such steam will be discharged as condensate from the heating fluid outlet 11 of the primary heating coil 9 and any hot combustion gases effluent will be discharged through the exhaust gas outlet 17 together with exhaust gases from the sludge.

The apparatus further includes a conduit 29 leading from the wet sludge outlet 8 of the rotary-drum filter 1 to the wet sludge inlet 15 of the drier 2, a conduit 30 leading from the dried sludge outlet 16 of the drier 2 to the charging shaft 21 of the incinerator 4, a conduit 31 leading from the exhaust gas outlet 17 of the drier 2 to the exhaust gas inlet 18 of the condenser 3, and a conduit 32 leading from the exhaust gas outlet 19 of the condenser 3 to an exhaust gas inlet at 33 in the combustion chamber 23 of the incinerator 4.

In operation, aqueous sewage sludge such as from a community sewage treatment plant and having a water content of about 92%, is brought through the inlet 7 into the rotarydrum filter 1 where it is mechanically de-watered to obtain a wet sludge having a high solids content. The wet sludge is led from the outlet 8 of the filter 1 through conduit 29 to the wet sludge inlet 15 of the drier 2. As described above, the drier 2 is being heated either entirely or at least primarily by means of steam generated in boiler 6 and conducted by conduit 28 to the heating fluid inlet 10 of the heating passage 9, the steam leaving as condensate at the heating fluid outlet 11 of the heating passage 9. In the drier 2, the wet sludge is indirectly heated by the steam or other heating fluid and substantially completely dried so as to produce in the drier a dried sludge and an exhaust gas comprising the air brought into the drier, some malodorous gases and the water vapor evaporated from the sludge. The dried sludge leaving the drier at the outlet 16 is transported, preferably pneumatically, through the conduit 30 to the charging shaft 21 of the incinerator 4. The dried sludge passes through the charging shaft 21 to form a layer on the combustion grate 22 at which point it is ignited and burnt out in known manner, the non-combustible clinker being discharged through the opening 24. In addition to sludge, the incinerator may also be normally operating on household refuse. The hot combustion gases in the combustion chamber 23 pass through the outlet duct 25 and the electrical precipitator 5 so as to remove therefrom any solid particles that may be suspended therein, and are thereafter discharged to the atmosphere. Optionally, as described above, a small quantity of the combustion gases may be diverted through outlet opening 26 of the outlet duct 25 and through conduit 27 to the heating gas inlet 13 of the drier 2 for secondarily heating the drier. The combustion gases so diverted are discharged through the exhaust gas outlet 17.

The water vapor-containing exhaust gas produced in the drier 2 leaves the drier through the exhaust gas outlet 17 and is conducted through the conduit 31 to the exhaust gas inlet 18 of the condenser 3. In the condenser the water vapor is condensed and removed from the exhaust gas and is discharged as condensate through outlet 20. The substantially dried exhaust gas leaving the outlet 19 of the condenser is conducted through the conduit 32 to the exhaust gas inlet 33 in the combustion chamber 23 of the incinerator 4. In the combustion chamber, the exhaust gas is heated with the aid of the hot combustion gases therein, and is thereby effectively deodorized.

What is claimed is:

1. A process for the incineration of aqueous sewage sludge such as from community sewage treatment plants, said process comprising the steps of:

mechanically de-watering said aqueous sewage sludge to obtain a wet sludge having a high solids content;

indirectly heating and substantially completely drying said wet sludge in a heated drier, thereby producing in the drier a dried sludge and a water vapor-containing exhaust gas;

conducting said dried sludge from the drier to a solid refuse incinerator for incineration;

conducting said water vapor-containing exhaust gas from the drier through a condenser, whereby the water vapor is condensed and removed from the exhaust gas to produce a substantially dry exhaust gas; and conducting said substantially dry exhaust gas from the condenser into the combustion chamber of said incinerator, whereby said exhaust gas is deodorized by heating with the aid of the hot combustion gases in the incinerator.

2. The process of Claim 1 wherein the mechanical de-watering of said aqueous sewage sludge is effected by filtration.

3. The process of Claim 1 wherein the heating of the sludge is effected at least primarily by means of steam.

4. The process of Claim 3 wherein the heating of the sludge is effected also secondarily by direct heating with hot combustion gases effluent from said incinerator.

5. An apparatus for the incineration of aqueous sewage sludge such as from community sewage treatment plants, said apparatus comprising a mechanical de-watering means for de-watering aqueous sewage sludge and converting it to a wet sludge having a high solids content, said de-watering means having a sludge inlet and outlet, an indirect drier means for substantially completely drying the wet sludge produced in said de-watering means, said drier means having a sludge inlet and outlet and an outlet for the water vapor-containing exhaust gas produced in said drier means, conduit means coupled between said sludge outlet of said de-watering means and said sludge inlet of said drier means, a condenser means for condensing and removing the water vapor from the exhaust gas produced in said drier means, said condenser means having an exhaust gas inlet and outlet, conduit means coupled between said exhaust gas outlet of said drier means and said exhaust gas inlet of said condenser means, a combustion chamber means for the incinceration of the dried sludge produced in said drier means, said combustion chamber means having a charging shaft and an exhaust gas inlet, conduit means coupled between said sludge outlet of said drier means and said charging shaft of said combustion chamber means for charging said combustion chamber with dried sludge, and conduit means coupled between said exhaust gas outlet of said condenser means and said exhaust gas inlet of said combustion chamber means whereby said exhaust gas is deodorized by heating with the aid of the hot combustion gases in said combustion chamber.

6. The apparatus of Claim 5 wherein said de-watering means comprises a rotary-drum filter.

7. The apparatus of Claim 5, wherein said drier means has a heating fluid inlet to a heating fluid passage in the drier means, and further including a boiler means for producing steam for heating said drier means and conduit means coupled between said boiler means and said heating fluid inlet of said drier means.

8. The apparatus of Claim 7, wherein said drier means also has a heating gas inlet to the sludge therein and said combustion chamber means has an outlet for the hot combustion gases emanating therefrom, and further including conduit means coupled between said combustion gas outlet of said combustion chamber means and said heating gas inlet of said drier means whereby said hot combustion gases serve to secondarily directly heat the sludge in the drier means.

9. The apparatus of Claim 8, further including electrical precipitator means disposed in said combustion gas outlet of said combustion chamber means to effect removal of any solid particles which may be suspended in said hot combustion gases prior to their being conducted to said heating gas inlet of said drier means.

* * * * *